US012613772B2

(12) United States Patent
Jeong et al.

(10) Patent No.: US 12,613,772 B2
(45) Date of Patent: Apr. 28, 2026

(54) MEMORY DEVICE AND OPERATING METHOD THEREOF

(71) Applicant: SK hynix Inc., Gyeonggi-do (KR)

(72) Inventors: Young Mok Jeong, Gyeonggi-do (KR); Hong Ki Moon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/914,267

(22) Filed: Oct. 14, 2024

(65) Prior Publication Data

US 2025/0370860 A1     Dec. 4, 2025

(30) Foreign Application Priority Data

May 31, 2024    (KR) ........................ 10-2024-0071590

(51) Int. Cl.
*G06F 11/00*          (2006.01)
*G06F 11/10*          (2006.01)
(52) U.S. Cl.
CPC ........ *G06F 11/1044* (2013.01); *G06F 11/106* (2013.01)
(58) Field of Classification Search
CPC ............... G06F 11/1044; G06F 11/106; G06F 11/1056; G06F 11/1629
See application file for complete search history.

(56) References Cited

U.S. PATENT DOCUMENTS

| | | | |
|---|---|---|---|
| 9,053,813 B2 * | 6/2015 | Kang .................... | G06F 3/0652 |
| 11,385,963 B1 | 7/2022 | Benisty et al. | |
| 2012/0131417 A1 * | 5/2012 | Rodriguez ............ | G06F 11/106 |
| | | | 714/763 |

FOREIGN PATENT DOCUMENTS

KR     10-2021-0157830 A     12/2021

* cited by examiner

*Primary Examiner* — Katherine Lin
(74) *Attorney, Agent, or Firm* — IP & T GROUP LLP

(57)          ABSTRACT

A memory device includes a memory cell array including normal cell blocks and at least one error correction code (ECC) cell block, which include a plurality of rows; a scrub control circuit configured to perform an error check operation on each of the plurality of rows; and a write-back prevention circuit configured to store, based on local error signals for the normal cell blocks and the at least one ECC cell block during the error check operation, a severe address for a row in which a severe error occurs, and selectively perform a write-back operation on the row corresponding to the stored severe address during the error check operation or a read-modify-write (RMW) operation.

21 Claims, 13 Drawing Sheets

Figure 10:
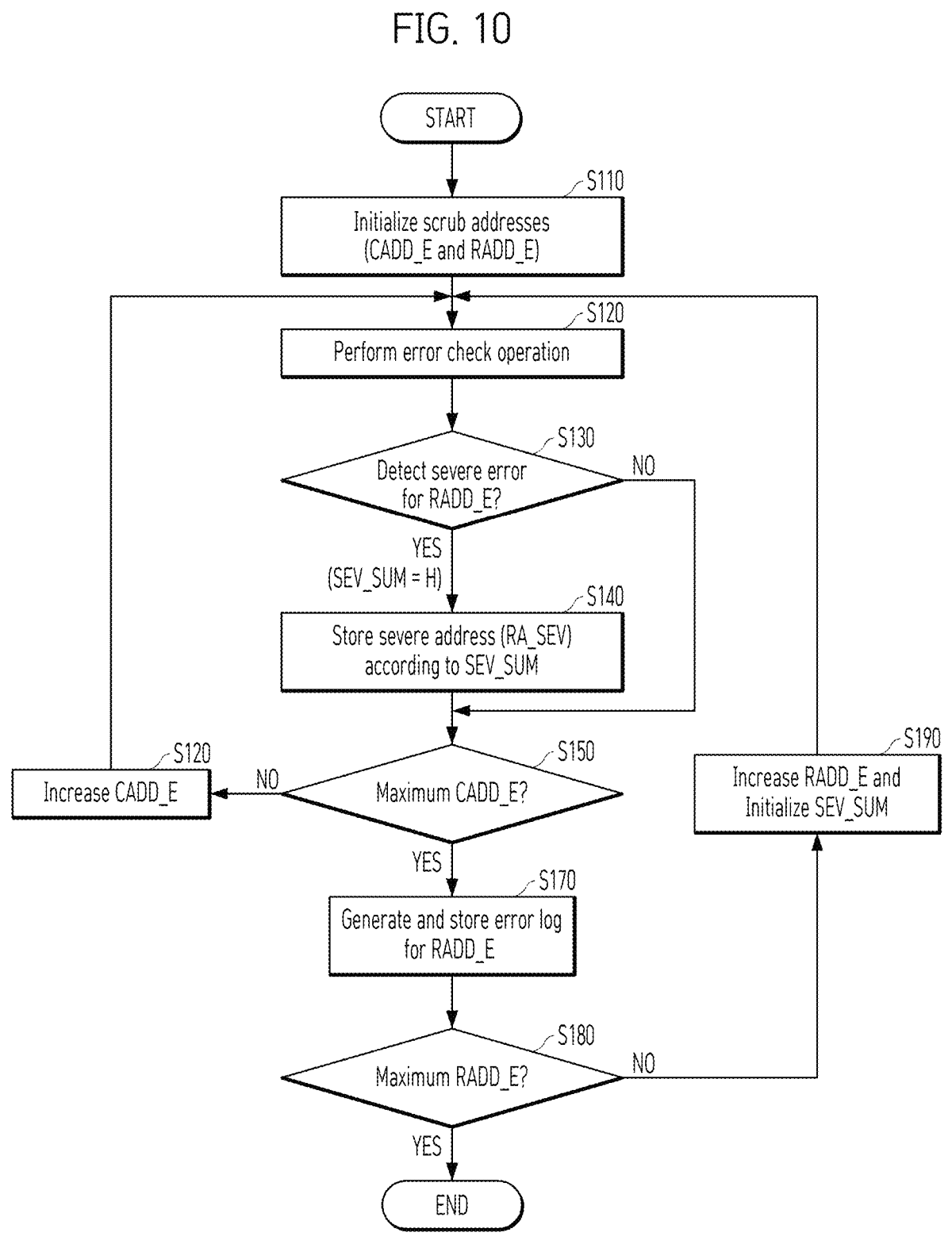

START

S110

Initialize scrub addresses
(CADD_E and RADD_E)

S120

Perform error check operation

S130

Detect severe error
for RADD_E? —— NO

YES
(SEV_SUM = H)

S140

Store severe address (RA_SEV)
according to SEV_SUM

S120

Increase CADD_E ◄— NO —— Maximum CADD_E?    S150

YES

S170

Generate and store error log
for RADD_E

S180

Maximum RADD_E? —— NO

YES

S190

Increase RADD_E and
Initialize SEV_SUM

END

MEMORY DEVICE AND OPERATING METHOD THEREOF

CROSS-REFERENCE TO RELATED APPLICATION

The present application claims priority under 35 U.S.C 119(a) to Korean Patent Application No. 10-2024-0071590, filed on May 31, 2024, which is incorporated herein by reference in its entirety.

BACKGROUND

1. Field

Various embodiments of the present disclosure relate to a semiconductor design technology, and more particularly, to a memory device performing an error check operation and a read-modify-write (RMW) operation.

2. Description of the Related Art

A memory device may store data provided from an external device and provide the stored data to the external device. The memory device may include an error correction circuit to ensure data reliability. Recently, a memory device may store data and an error correction code together in a memory cell array, and an error correction circuit may perform an error correction operation of detecting and correcting an error of data read from the memory cell array using an error correction code read from the memory cell array.

When an error correction circuit having single-bit error correction capability tries to correct a multi-bit error, a miscorrection of the error correction circuit occurs. Thus, the number of error bits increases further, so that the error cannot be corrected by the error correction capability of the memory controller. Recently, various methods for managing such miscorrection when it occurs within a boundary of a set specification have been proposed.

SUMMARY

Embodiments of the present disclosure are directed to a memory device capable of detecting a row in which a severe error causing a miscorrection during an error check operation occurs and preventing a write-back operation on the row during the error check operation or a read-modify-write (RMW) operation, and an operating method thereof.

According to an embodiment of the present disclosure, a memory device includes a memory cell array including normal cell blocks and at least one error correction code (ECC) cell block, which include a plurality of rows; a scrub control circuit configured to perform an error check operation on each of the plurality of rows; and a write-back prevention circuit configured to store, based on local error signals for the normal cell blocks and the at least one ECC cell block during the error check operation, a severe address for a row in which a severe error occurs, and selectively perform a write-back operation on the row corresponding to the stored severe address during the error check operation or a read-modify-write (RMW) operation.

According to an embodiment of the present disclosure, a memory device includes a plurality of normal cell blocks and at least one error correction code (ECC) cell block; a first detection signal generation circuit configured to generate, during an error check operation, a first detection signal according to a local error signal for a first normal cell block adjacent to the at least one ECC cell block, among the plurality of normal cell blocks; a second detection signal generation circuit configured to generate a second detection signal according to a local error signal for the at least one ECC cell block, during the error check operation; a third detection signal generation circuit configured to generate, during the error check operation, a third detection signal according to a local error signal for a second normal cell block adjacent to the at least one ECC cell block, among the plurality of normal cell blocks; a severity determination circuit configured to generate a detection signal based on the first to third detection signals; an error storage circuit configured to store a row address according to the detection signal; and a write-back control circuit configured to control a write-back operation of a row corresponding to the stored row address, to be skipped.

According to an embodiment of the present disclosure, an operating method of a memory device including a plurality of normal cell blocks and at least one error correction code (ECC) cell block, which include a plurality of rows, includes performing an error check operation on a target row among the plurality of rows; generating a detection signal based on local error signals for the normal cell blocks and the at least one ECC cell block, during the error check operation; storing a severe address for the target row in an error storage circuit according to the detection signal; and initializing the detection signal when completing the error check operation, wherein the performing the error check operation, the generating the detection signal, the storing the severe address, and the initializing the detection signal are repeatedly performed on the plurality of rows.

Further, according to embodiments of the present disclosure, the memory device can skip/omit a write-back operation on rows with a severe error, to thereby prevent a miscorrection caused by the severe error and maximize the error correction capability thereof. In addition, according to embodiments of the present disclosure, the memory device can provide an optimized reliability, accessibility, and serviceability (RAS) action by providing information on the severe error as error log information that is provided to the external device as a result of the error check operation.

BRIEF DESCRIPTION OF THE DRAWINGS

FIG. 2 is a diagram illustrating a memory cell array of FIG. 1, according to an embodiment of the present disclosure.

FIGS. 10 and 11 are flowcharts for describing an error check operation according to an embodiment of the present disclosure.

DETAILED DESCRIPTION

Figure 1:
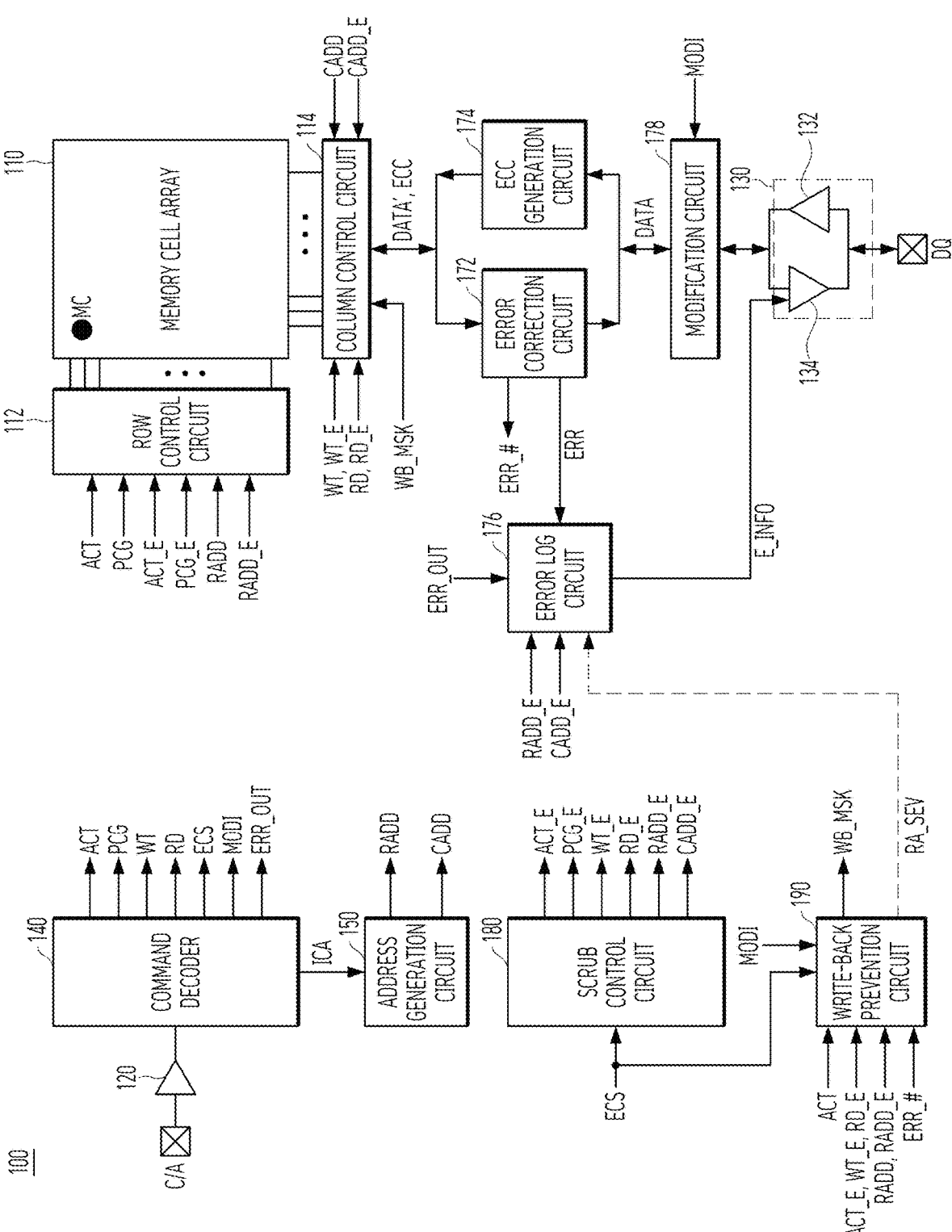
FIG. 1 is a block diagram illustrating a memory device according to an embodiment of the present disclosure.

Various embodiments of the present disclosure will be described below in more detail with reference to the accompanying drawings. The embodiments of the present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout this disclosure, like reference numerals refer to like parts throughout the various figures and embodiments of the present disclosure.

It will be understood that when an element is referred to as being "coupled" or "connected" to another element, it may mean that the two are directly coupled or the two are electrically connected to each other with another circuit intervening therebetween. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof. In the present disclosure, the singular forms are intended to include the plural forms as well, unless the context clearly indicates otherwise.

Hereinafter, a memory device is described as a semiconductor device including a sampling circuit. However, the embodiments of the present disclosure are not limited thereto, and may be applied to all semiconductor devices including a sampling circuit for randomly sampling an input address or input signals.

Figure 2:
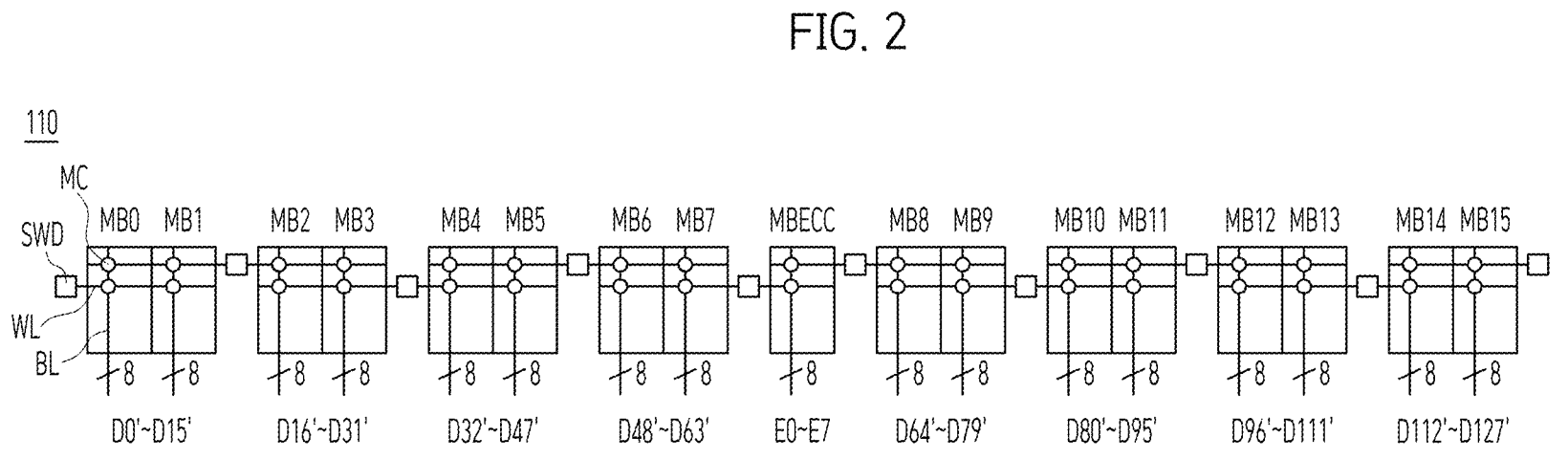

FIG. 1 is a block diagram illustrating a memory device 100 in accordance with an embodiment of the present disclosure. FIG. 2 is a diagram illustrating a memory cell array 110 of FIG. 1, according to an embodiment of the present disclosure.

Referring to FIG. 1, the memory device 100 may include the memory cell array 110, a row control circuit 112, a column control circuit 114, a command/address (CA) receiving circuit 120, a data input/output circuit 130, a command decoder 140, an address generation circuit 150, an error correction circuit 172, an error correction code (ECC) generation circuit 174, an error log circuit 176, a modification circuit 178, a scrub control circuit 180, and a write-back prevention circuit 190.

The memory cell array 110 may include a plurality of memory cells MC disposed in an array type. The plurality of memory cells MC may be respectively coupled to a plurality of word lines WL (hereinafter referred to as "a plurality of rows WL") and a plurality of bit lines BL (hereinafter referred to as "a plurality of columns BL"). The plurality of rows WL may extend in a first direction (e.g., a row direction) and may be sequentially disposed in a second direction (e.g., a column direction) perpendicular to the first direction. The plurality of columns BL may extend in the column direction and may be sequentially disposed in the row direction. The plurality of memory cells MC may be composed of memory cells that require a refresh operation to secure data retention time. The memory cell array 110 may be composed of at least one bank. The number of banks or the number of memory cells MC may be determined depending on the capacity of the memory device 100.

Referring to FIG. 2, the memory cell array 110 may include a plurality of cell blocks arranged in the row direction. Each cell block may include the plurality of memory cells MC connected between the plurality of rows WL and the plurality of columns BL. In an embodiment of the present invention, a "cell block" may be defined as a set of memory cells that share the rows WL and the columns BL and are arranged in the same form.

The plurality of cell blocks may include a plurality of normal cell blocks, e.g., first to 16-th normal cell blocks MB0 to MB15, and at least one error correction code (ECC) cell block MBECC. The first to 16-th normal cell blocks MB0 to MB15 may store data D0' to D127' (corresponding to DATA' of FIG. 1) which are provided from an external device (e.g., a memory controller) through the data input/output circuit 130. The first to 16-th normal cell blocks MB0 to MB15 may be regions for storing user data and are memory blocks for determining a memory capacity of the memory device 100. The ECC cell block MBECC may store an error correction code E0 to E7 (corresponding to ECC of FIG. 1) generated by the ECC generation circuit 174 for an error correction operation. The error correction code E0 to E7 may include known parity bits. The first to 16-th normal cell blocks MB0 to MB15 may be divided into the first to eighth normal cell blocks MB0 to MB7 corresponding to a lower group and the ninth and 16-th normal cell blocks MB8 to MB15 corresponding to an upper group. In this case, the first to eighth normal cell blocks MB0 to MB7, the ECC cell block MBECC, and the ninth and 16-th normal cell blocks MB8 to MB15 may be sequentially disposed in the row direction.

For reference, the memory device 100 of FIG. 2 shows a case where data is input/output in 8-bit units for each cell block during a single write and read operation. That is, the memory cell array 110 of FIG. 1 may input/output 128-bit data D0' to D127' and use an 8-bit error correction code E0 to E7.

Rectangles between the cell blocks MB0 to MB15 and MBECC may represent sub-word line drivers SWD, and lines extending left and right of the sub-word line drivers SWD may represent rows WL (i.e., word lines or sub-word lines). In reality, there are far more sub-word line drivers and word lines, but only a few are shown here to represent a simple structure. Since adjacent cell regions among the cell blocks MB0 to MB15 and MBECC share sub-word line drivers, when a defect occurs in the sub-word line driver, an error is likely to occur in cell blocks at both sides of the sub-word line driver. For example, since the second normal cell block MB1 and the third normal cell block MB2 share a sub-word line driver, errors may occur simultaneously in the first to fourth normal cell blocks MB0 to MB3 when a defect occurs in the shared sub-word line driver.

Referring back to FIG. 1, the CA receiving circuit 120 may receive a command/address signal C/A from the memory controller. Depending on the type of memory device 100, a command and an address may be input through the same input terminals, or a command and an address may be input through separate input terminals, where it is illustrated that the command and the address are input through the same input terminals. The command/address signal C/A may be formed of multiple bits.

The data input/output circuit 130 may transmit data DQ to the memory controller, or receive the data DQ from the memory controller. The data input/output circuit 130 may include a data input circuit 132 and a data output circuit 134. The data input circuit 132 may receive the data DQ provided from the memory controller during a write operation. The data output circuit 134 may output the data DQ read from the memory cell array 110 to the memory controller during a read operation.

The command decoder 140 may decode the command/ address signal C/A received by the CA receiving circuit 120 to generate an active command ACT, a precharge command PCG, a write command WT, a read command RD, a scrub command ECS, an error information request command ERR_OUT, and a modification signal MODI.

The active command ACT is a signal input when an active operation is instructed, the precharge command PCG is a signal input when a precharge operation is instructed, the write command WT is a signal input when a write operation is instructed, and the read command RD may be a signal input when a read operation is instructed. In addition, the scrub command ECS is a signal input when an error check operation is instructed, and the error information request command ERR_OUT is a signal input when the error information is requested. For reference, the error check operation, also called an error check and scrub (ECS) operation, may mean an operation of reading data DATA' from the memory cell array 110 and checking an error in the data DATA' using the error correction circuit 172, and selecting an area with many errors. The modification signal MODI is a signal to instruct a data modification operation during a read-modify-write (RMW) operation. When the RMW operation is instructed by the command/address signal C/A, the command decoder 140 may sequentially generate the read command RD, the modification signal MODI, and the write command WT.

The address generation circuit 150 classifies an internal address ICA received from the command decoder 140 into a row address RADD and a column address CADD. The row address RADD may be an address for selecting one of the plurality of rows WL, and the column address CADD may be an address for selecting columns for performing a read operation from the plurality of columns BL. Each of the row address RADD and the column address CADD may be formed of multiple bits.

The error correction circuit 172 may correct an error of the read data DATA' using the error correction code ECC read from the memory cell array 110 during a read operation, to output error-corrected data DATA. Here, correcting the error may mean an error check operation of checking the error in the data DATA' using the error correction code ECC and an error correction operation of correcting the error in the data DATA' when the error is detected. The error correction circuit 172 may check and correct an error of the error correction code ECC together with the data DATA'. When an error of the data DATA' is detected and the error is corrected, the data DATA' input to the error correction circuit 172 and the data DATA output from the error correction circuit 172 may be different from each other. The error correction circuit 172 may output an error signal ERR that is activated when an error is detected during the error check operation.

Further, the error correction circuit 172 may output information on a cell block in which an error has occurred among the cell blocks MB0 to MB15 and MBECC as a plurality of local error signals ERR_#. The plurality of local error signals ERR_# respectively correspond to the cell blocks MB0 to MB15 and MBECC, and when an error occurs in the corresponding cell block, a corresponding local error signal may be activated. The error correction circuit 172 may activate the error signal ERR when one of the local error signals ERR_# is activated. The local error signals ERR_# and the error signal ERR may be signals activated to a logic high level. A detailed configuration of the error correction circuit 172 will be described in FIGS. 4 and 5.

The ECC generation circuit 174 may generate the error correction code ECC by using the data DATA during the write operation. During the write operation, since the error correction code ECC is generated using the data DATA and the error of the data DATA is not corrected, the data DATA input to the ECC generation circuit 174 are identical to the data DATA' output from the ECC generation circuit 174.

The error log circuit 176 may log an error found during an error check operation. More specifically, the error log circuit 176 may store error information E_INFO according to the error signal ERR activated during the error check operation. For example, the error log circuit 176 may count the number of errors for each row, classify a row whose number exceeds a threshold value as a bad region, and store the bad region as the error information E_INFO. Since the error log circuit 176 receives a scrub row address RADD_E, a scrub column address CADD_E, and the error signal ERR, it is possible to check which area of the memory cell array 110 where the error is found. The error log circuit 176 may transmit the stored error information E_INFO to the memory controller through the data output circuit 134 of the data input/output circuit 130, in response to the error information request command ERR_OUT.

The modification circuit 178 may be a circuit for performing the data modification operation during the RMW operation. The modification circuit 178 may generate partial write data by combining the data DQ transmitted from the memory controller and the error-corrected data DATA output from the error correction circuit 172 in response to the modification signal MODI. During a normal write operation and a normal read operation other than the RMW operation, data may bypass the modification circuit 178. That is, in the normal write operation, the data DQ input to the modification circuit 178 are identical to the data DATA output from the modification circuit 178. In the normal read operation, the data DATA input to the modification circuit 178 are identical to the data DQ output from the modification circuit 178.

The scrub control circuit 180 may generate a scrub active signal ACT_E, a scrub precharge signal PCG_E, a scrub write signal WT_E and a scrub read signal RD_E, to perform the error check operation according to the scrub command ECS. The scrub control circuit 180 may sequentially activate the scrub active signal ACT_E, the scrub read signal RD_E, the scrub write signal WT_E, and the scrub precharge signal PCG_E according to the scrub command ECS to control the error check operation including an active operation, a read operation, a write operation, and a precharge operation to be performed. For reference, the error check operation may be performed by the active operation, the read operation, the write operation, and the precharge operation, but the write operation may be omitted according to an embodiment.

Further, the scrub control circuit 180 may generate the scrub row address RADD_E and the scrub column address CADD_E according to the scrub command ECS. The scrub address generation circuit 182 may increase a value of the scrub column address CADD_E by "+1" whenever the scrub command ECS is input, and may increase a value of the scrub row address RADD_E by "+1" when the value of the scrub column address CADD_E reaches a maximum value. For example, when the value of the scrub row address RADD_E ranges from 0 to 3 and the value of the scrub column address CADD_E ranges from 0 to 3, the scrub control circuit 180 may generate the scrub addresses (RADD_E, CADD_E) to be changed whenever the scrub command ECS is input, as follows: (0, 0)→(0, 1)→(0, 2)→(0, 3)→(1, 0)→(1, 1)→(1, 2)→(1, 3)→(2, 0)→(2, 1)→(2, 2)→(2, 3)→(3, 0)→(3, 1)→(3, 2)→(3, 3).

The row control circuit 112 may be coupled to the memory cell array 110 through the plurality of rows WL. The row control circuit 112 may perform an active operation of activating a row selected by the row address RADD in response to the active command ACT, and may perform a precharge operation of precharging the activated row in response to the precharge command PCG. Further, the row control circuit 112 may perform an active operation of activating a row selected by the scrub row address RADD_E in response to the scrub active signal ACT_E, and a precharge operation of precharging the active row in response to the scrub precharge signal PCG_E.

The column control circuit 114 may be coupled to the memory cell array 110 through the plurality of columns BL. The column control circuit 114 may select some columns of the plurality of columns BL of the memory cell array 110 according to the column address CADD, perform a read operation of reading the data DATA' and the error correction code ECC from the memory cells MC through the selected columns in response to the read command RD, or perform a write operation of writing the data DATA' and the error correction code ECC to the memory cells MC through the selected columns in response to the write command WT. Further, the column control circuit 114 may select some columns of the plurality of columns BL of the memory cell array 110 according to the scrub column address CADD_E, perform a read operation of reading the data DATA' and the error correction code ECC from the memory cells MC through the selected columns in response to the scrub read signal RD_E, or perform a write operation of writing the data DATA' and the error correction code ECC to the memory cells MC through the selected columns in response to the scrub write command WT_E.

In an embodiment of the present disclosure, the column control circuit 114 may selectively perform the write operation according to a masking signal WB_MSK. For example, even if the write command WT or the scrub write signal WT_E is activated, the column control circuit 114 may omit the write operation when the masking signal WB_MSK is activated. Hereinafter, the write operation performed during the error check operation and the RMW operation is defined as a "write-back operation".

The write-back prevention circuit 190 may generate the masking signal WB_MSK according to the scrub command ECS, the modification signal MODI, the active command ACT, the scrub active signal ACT_E, the scrub read signal RD_E, the scrub write signal WT_E, the row address RADD, the scrub row address RADD_E, and the local error signals ERR_#.

The write-back prevention circuit 190 may detect a severe error (or a serious error) based on the local error signals ERR_# during the error check operation for each row, and may store the scrub row address RADD_E having the detected severe error as a severe address RA_SEV. For example, the write-back prevention circuit 190 may detect the severe error based on a local error signal (ERR_E of FIG. 4) corresponding to the ECC cell block MBECC, and local error signals (ERR_67 and ERR_89 of FIG. 4) corresponding to the normal cell blocks MB6 to MB9 which share a sub-word line driver with the ECC cell block MBECC, among the local error signals ERR_#. The write-back prevention circuit 190 may store the scrub row address RADD_E having the detected severe error as the severe address RA_SEV, and generate the masking signal WB_MSK to omit the write-back operation for the row corresponding to the stored severe address RA_SEV during the error check operation and the RMW operation.

Depending on an embodiment, the write-back prevention circuit 190 may provide the stored severe address RA_SEV to the error log circuit 176 (indicated by a dotted line). The error log circuit 176 may store the severe address RA_SEV as a part of the error information E_INFO, and transmit the stored error information E_INFO to the memory controller through the data output circuit 134 of the data input/output circuit 130.

Even if a defect occurs in a sub-word line driver driving the normal cell blocks MB0 to MB15, the error correction circuit 172 may manage a miscorrection within a boundary fault coverage. However, when a defect occurs in a sub-word line driver driving the ECC cell block MBECC, the error correction circuit 172 may cause a miscorrection beyond the boundary fault coverage.

In an embodiment of the present disclosure, it can be determined that a severe error has occurred when an error occurs in both the ECC cell block MBECC and one or more normal cell blocks among the normal cell blocks MB6 to MB9 which share sub-word line drivers with the ECC cell block MBECC, during an error check operation for a specific row. That is, when an error occurs in column 0 of the ECC cell block MBECC and an error occurs in column 7 of the tenth normal cell block MB9, it is determined that a severe error has occurred. When a write-back operation is performed during an error check operation or a RMW operation, in a state that the severe error has occurred, the error spreads to another normal cell block (e.g., MB13) due to the error correction circuit 172, and the number of error bits accumulates and increases as the write-back operation continues.

In accordance with an embodiment of the present disclosure, the memory device 100 may detect a row in which a severe error has occurred, to omit a write-back operation for the row during an error check operation and a RMW operation. Accordingly, the memory device 100 may prevent a miscorrection caused by the severe error and maximize the error correction capability.

The error correction circuit 172 and the ECC generation circuit 174 may generate the error correction code using a check matrix, also called an H matrix, and correct an error using the error correction code. To this end, the error correction circuit 172 and the ECC generation circuit 174 may include a plurality of check matrix calculation circuits (referred to as "code calculation circuits"). According to an embodiment, the error correction circuit 172 and the ECC generation circuit 174 may use common code calculation circuits or may use separate code calculation circuits, respectively. The code calculation circuit may generate the error correction code by applying a known BCH code, Hamming code, or RS code. The code calculation circuit may generate the error correction code by applying another type of parity code.

Figure 3:
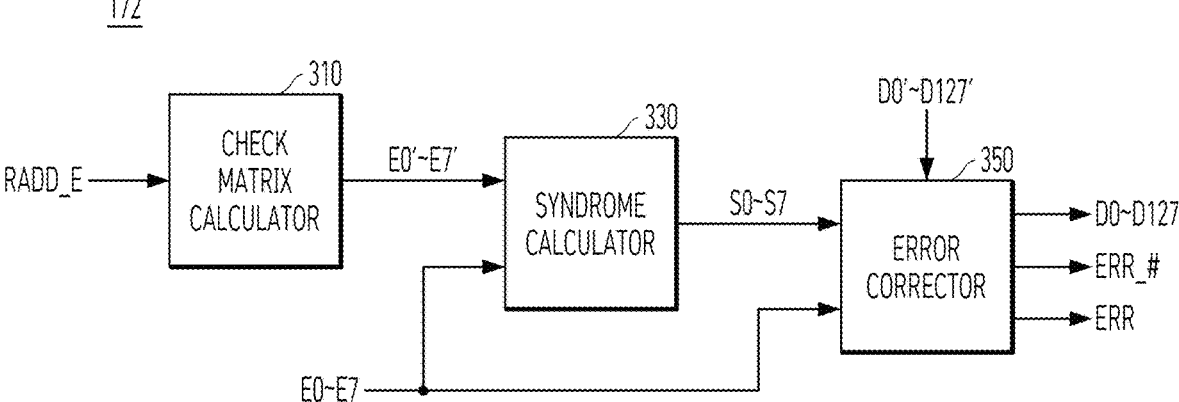
FIG. 3 is a block diagram illustrating an error correction circuit of FIG. 1, according to an embodiment of the present disclosure.

FIG. 3 is a block diagram illustrating the error correction circuit 172 of FIG. 1, according to an embodiment of the present disclosure.

Referring to FIG. 3, the error correction circuit 172 may include a check matrix calculator 310, a syndrome calculator 330, and an error corrector 350.

The check matrix calculator 310 may generate a preliminary error correction code E0' to E7' by calculating a check matrix and the data D0' to D127' read from the memory cell array 110 during a read operation. The check matrix calculator 310 may generate the preliminary error correction code E0' to E7' expressed as an $8 \times 1$ matrix by performing matrix-product calculations on an $8 \times 128$ check matrix and the data D0' to D127' expressed as a $128 \times 1$ matrix.

The syndrome calculator 330 may generate a syndrome S0 to S7 by adding the error correction code E0 to E7 read from the memory cell array 110 to the preliminary error correction code E0' to E7'.

The error corrector 350 may correct an error in the data D0' to D127' read from the memory cell array 110 by using the syndrome S0 to S7 to output the error-corrected data D0 to D127. The error corrector 350 may determine that there is no error in the data D0' to D127' when a value of the syndrome S0 to S7 is 0. On the other hand, when the value of the syndrome S0 to S7 is not 0, the error corrector 350 may determine that there is an error in the data D0' to D127', to activate the error signal ERR. In addition, the error of the data D0' to D127' may be corrected by inverting a bit in which a value of a column vector of the check matrix is the same as that of the syndrome S0 to S7 among the data D0' to D127'.

In an embodiment of the present disclosure, the error corrector 350 may generate the plurality of local error signals ERR_# for specifying a cell block to which erroneous data belongs when the error occurs in the data D0' to D127' and the error correction code E0 to E7. For example, when 17 cell blocks MB0 to MB15 and MBECC are arranged as shown in FIG. 2, the error corrector 350 may generate 9 local error signals ERR_# corresponding to two adjacent normal cell blocks and the ECC cell block MBECC, respectively.

Figure 4:
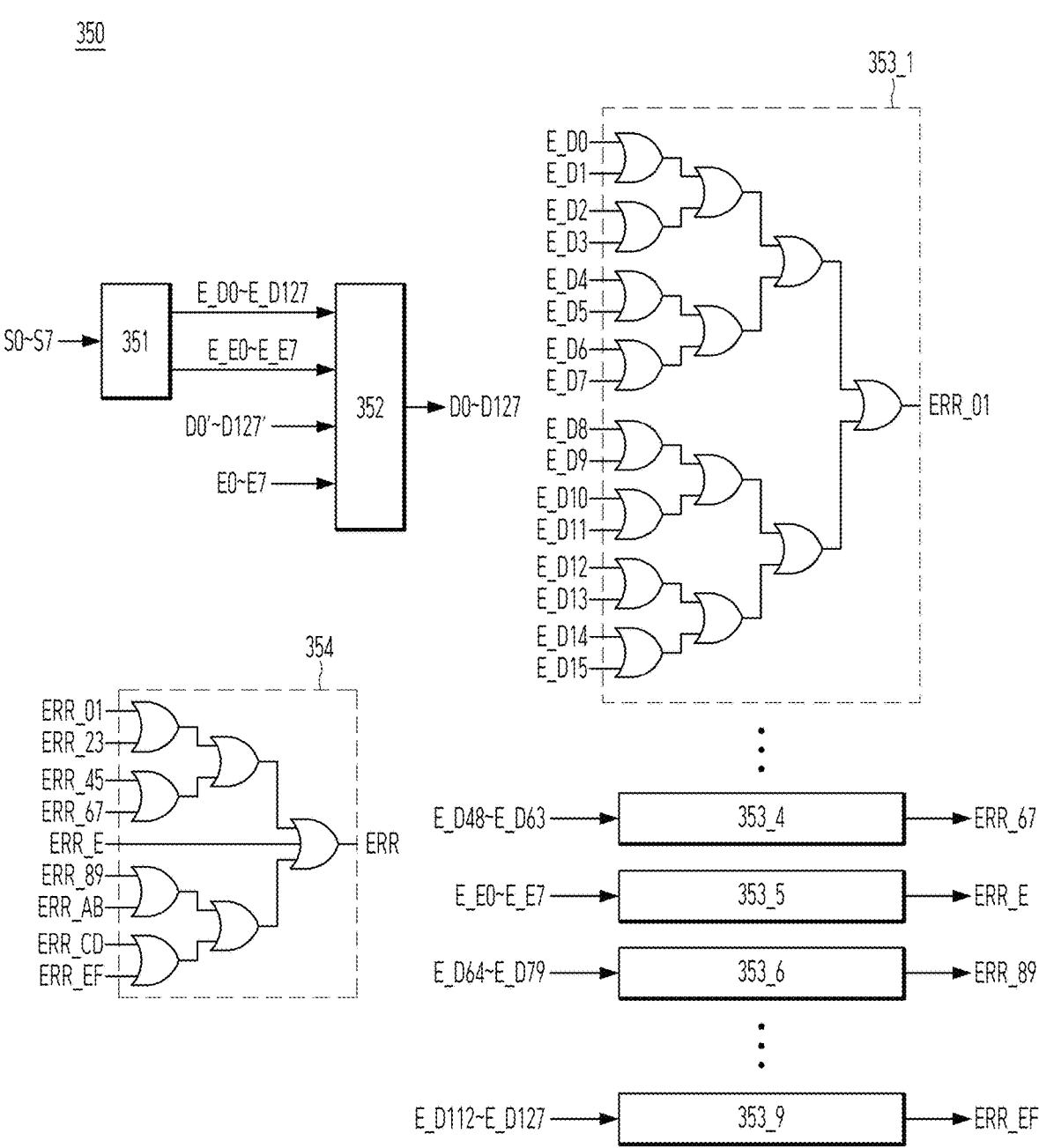
FIG. 4 is a circuit diagram illustrating an error corrector of FIG. 3, according to an embodiment of the present disclosure.

FIG. 4 is a circuit diagram illustrating the error corrector 350 of FIG. 3, according to an embodiment of the present disclosure.

Referring to FIG. 4, the error corrector 350 may include an error code generator 351, an error corrector 352, first to ninth local error signal generators 353_1 to 353_9, and an error signal generator 354.

The error code generator 351 may compare the value of the syndrome S0 to S7 with pre-stored code values to generate a plurality of error codes E_D0 to E_D127 and E_E0 to E_E7. The error code generator 351 may store column vectors of the check matrix as a plurality of code values to output the plurality of error codes E_D0 to E_D127 and E_E0 to E_E7 corresponding to each of the code values. The error code generator 351 may set an error code corresponding to a code value matching the value of the syndrome S0 to S7, among the stored code values, to a high bit. That is, the error codes E_D0 to E_D127 and E_E0 to E_E7 may be used to define an error location of the data D0' to D127' and the error correction code E0 to E7, which are read from the memory cell array 110.

The error corrector 352 may output the error-corrected data D0 to D127 by correcting an error in the data D0' to D127' and the error correction code E0 to E7 using the error codes E_D0 to E_127 and E_E0 to E_E7. The error corrector 352 may include logic gates (e.g., XOR gates) for performing a logic XOR operation on respective bits of the error codes E_D0 to E_D127 and E_E0 to E_E7, and the data D0' to D127' and the error correction code E0 to E7.

The first to ninth local error signal generators 353_1 to 353_9 may correspond to two adjacent normal cell blocks and the ECC cell block MBECC, respectively, to generate first to ninth local error signals ERR_01, ERR_23, ERR45, ERR_67, ERR_E, ERR_89, ERR_AB, ERR_CD, and ERR_EF based on the error codes E_D0 to E_D127 and E_D0 to E_E7. The first to ninth local error signal generators 353_1 to 353_9 may receive error codes corresponding to data read from corresponding cell blocks, to activate a corresponding local error signal when any of the received error codes is set to a high bit.

For example, the first error signal generator 353_1 may receive the error codes E_D0 to E_D15 corresponding to the data D0' to D15' output from the first and second normal cell blocks MB0 and MB1, to activate the first error signal ERR_01 when any of the error codes E_D0 to E_D15 is set to a high bit. The second error signal generator 353_2 may receive the error codes E_D16 to E_D31 corresponding to the data D16' to D31' output from the third and fourth normal cell blocks MB2 and MB3, to activate the second error signal ERR_23 when any of the error codes E_D16 to E_D31 is set to a high bit. The fifth error signal generator 353_5 may receive the error codes E_E0 to E_E7 corresponding to the error correction codes E0 to E7 output from the ECC cell block MBECC, to activate the fifth error signal ERR_E when any of the error codes E_E0 to E_E7 is set to a high bit.

The first to ninth local error signal generators 353_1 to 353_9 may each consist of logic gates (e.g., OR gates) for performing a logic OR operation on corresponding error codes.

The error signal generator 354 may activate the error signal ERR when any of the first to ninth local error signals ERR_01, ERR_23, ERR45, ERR_67, ERR_E, ERR_89, ERR_AB, ERR_CD, and ERR_EF is activated. The error signal generator 354 may include logic gates (e.g., OR gates) for performing a logic OR operation on the first to ninth local error signals ER_01, ERR_23, ERR_E, ER_89, ER_AB, ERR_CD, and ER_EF.

As described above, in an embodiment, when an error occurs in the data D0' to D127' and the error correction code E0 to E7, the error corrector 350 may generate the plurality of error signals ER_01, ERR_23, ERR45, ERR_67, ERR_E, ERR_89, ERR_AB, ERR_CD, and ERR_EF for specifying a cell block to which the erroneous data belongs.

Figure 5:
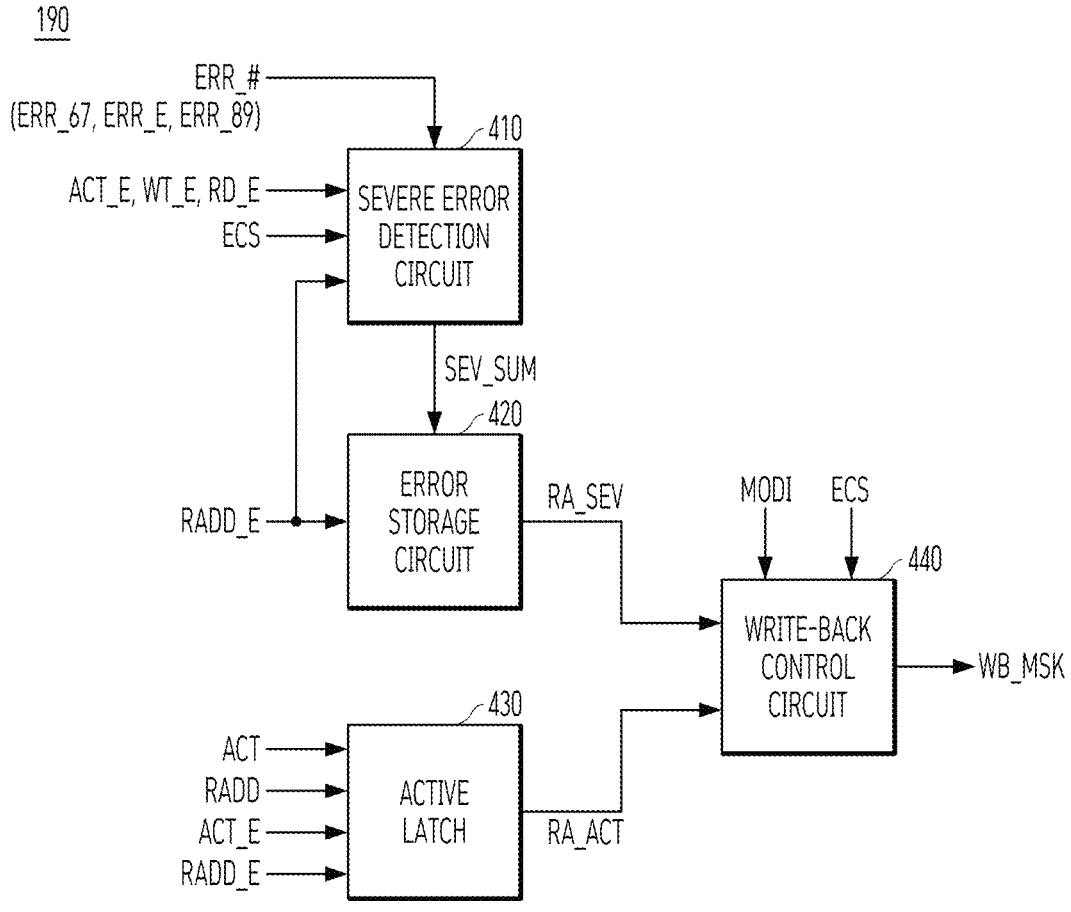
FIG. 5 is a block diagram illustrating a write-back prevention circuit of FIG. 1, according to an embodiment of the present disclosure.

FIG. 5 is a block diagram illustrating the write-back prevention circuit 190 of FIG. 1, according to an embodiment of the present disclosure.

Referring to FIG. 5, the write-back prevention circuit 190 may include a severe error detection circuit 410, an error storage circuit 420, an active latch 430, and a write-back control circuit 440.

The severe error detection circuit 410 may monitor an error check operation of a row corresponding to the scrub row address RADD_E according to the scrub command ECS, the scrub active signal ACT_E, the scrub read signal RD_E, and the scrub write signal WT_E. During the error check operation, the severe error detection circuit 410 may output a detection signal SEV_SUM by detecting whether a severe error has occurred in a row corresponding to the scrub row address RADD_E based on the fourth to sixth local error signals ERR_67, ERR_E, and ERR_89. The severe error detection circuit 410 may output the detection signal SEV_SUM of a logic high level when the severe error occurs in the row corresponding to the scrub row address RADD_E. The severe error detection circuit 410 may initialize the detection signal SEV_SUM whenever the scrub row address RADD_E is changed.

The error storage circuit 420 may store the scrub row address RADD_E as the severe address RA_SEV according to the detection signal SEV_SUM. The error storage circuit 420 may include a plurality of storage circuits, and sequentially store the scrub row address RADD_E as the severe address RA_SEV whenever the detection signal SEV_SUM is activated.

The active latch 430 may store and output an active address RA_ACT by latching the row address RADD according to the active command ACT, or latch the scrub row address RADD_E according to the scrub active signal ACT_E.

The write-back control circuit 440 may be enabled according to the scrub command ECS or the modification signal MODI, and generate the masking signal WB_MSK according to a comparison result of the severe address RA_SEV and the active address RA_ACT. The write-back control circuit 440 may activate the masking signal WB_MSK to a logic high level when the severe address RA_SEV is identical to the active address RA_ACT.

With the above configuration, the write-back prevention circuit 190 may detect the severe error based on the local error signals ERR_# during the error check operation for each row and store the scrub row address RADD_E having the detected severe error as the severe address RA_SEV. The write-back prevention circuit 190 may activate the masking signal WB_MSK to omit the write-back operation when the scrub row address RADD_E matches the stored severe address RA_SEV during the error check operation. In addition, the write-back prevention circuit 190 may activate the masking signal WB_MSK to omit the write-back operation when the row address RADD matches the stored severe address RA_SEV during the RMW operation.

Figure 6:
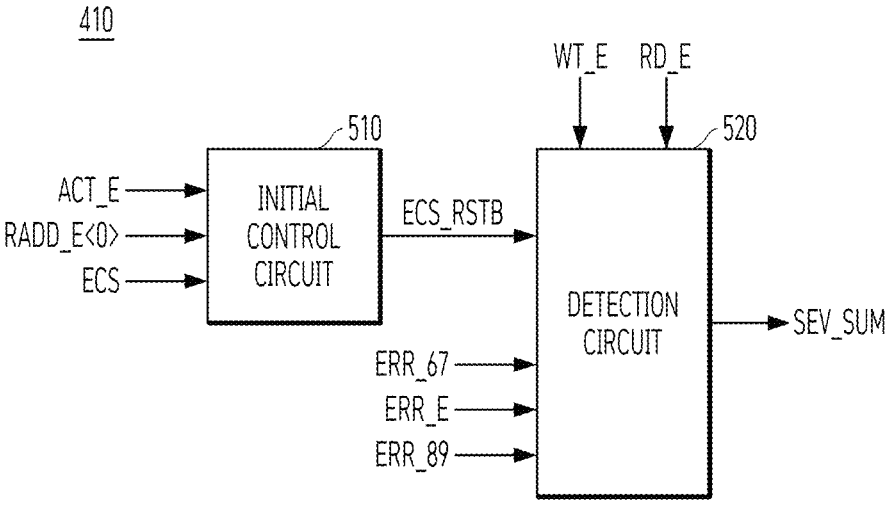
FIG. 6 is a block diagram illustrating a severe error detection circuit of FIG. 5, according to an embodiment of the present disclosure.

FIG. 6 is a block diagram illustrating the severe error detection circuit 410 of FIG. 5, according to an embodiment of the present disclosure.

Referring to FIG. 6, the severe error detection circuit 410 may include an initial control circuit 510 and a detection circuit 520.

The initial control circuit 510 may activate an initialization signal ECS_RSTB whenever the scrub row address RADD_E is changed during the error check operation according to the scrub command ECS and the scrub active signal ACT_E. For example, the initial control circuit 510 may activate the initialization signal ECS_RSTB to a logic low level whenever a least significant bit (LSB) (i.e., RADD_E<0>) of the scrub row address RADD_E toggles during the error check operation.

The detection circuit 520 may detect whether the severe error has occurred based on the fourth to sixth local error signals ERR_67, ERR_E, and ERR_89 during the error check operation, to output the detection signal SEV_SUM. The detection circuit 520 may detect whether the severe error has occurred based on the fourth to sixth local error signals ERR_67, ERR_E, and ERR_89 according to the scrub read signal RD_E, and output a detection result as the detection signal SEV_SUM according to the scrub write signal WT_E. That is, the detection circuit 520 may detect the severe error during the read operation of the error check operation, and output the detection signal SEV_SUM during the write-back operation of the error check operation. The detection circuit 520 may be initialized according to the initialization signal ECS_RSTB.

Figure 7:
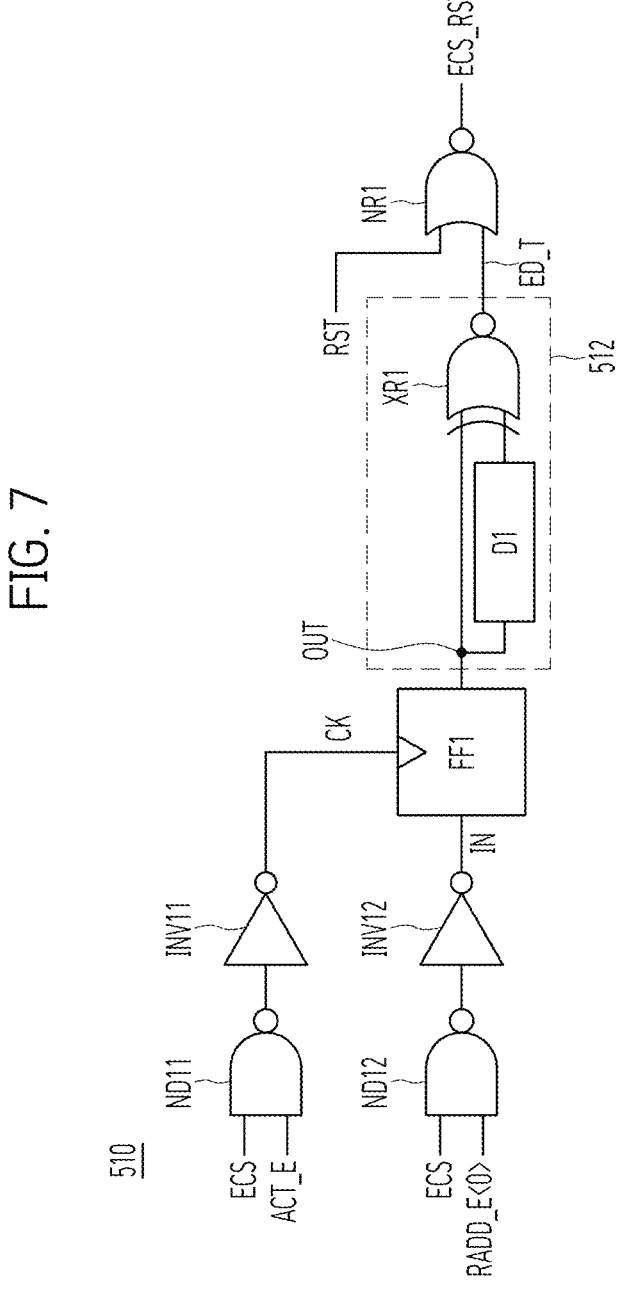
FIG. 7 is a detailed circuit diagram illustrating an initial control circuit of FIG. 6, according to an embodiment of the present disclosure.

FIG. 7 is a detailed circuit diagram illustrating the initial control circuit 510 of FIG. 6, according to an embodiment of the present disclosure.

Referring to FIG. 7, the initial control circuit 510 may include first and second NAND gates ND11 and ND12, first and second inverters INV11 and INV12, a flip-flop FF1, a transition detector 512, and a NOR gate NR1.

The first NAND gate ND11 and the first inverter INV11 may output a clock signal CK by performing a logic AND operation on the scrub command ECS and the scrub active signal ACT_E. That is, the first NAND gate ND11 and the first inverter INV11 may generate the clock signal CK that is activated when an active operation is performed during an error check operation. The second NAND gate ND12 and the second inverter INV12 may perform a logic AND operation on the scrub command ECS and the LSB (RADD_E<0>) of the scrub row address RADD_E to output an input signal IN. That is, the second NAND gate ND12 and the second inverter INV12 may output the input signal IN corresponding to the LSB (RADD_E<0>) of the scrub row address RADD_E during the error check operation.

The flip-flop FF1 may output the input signal IN as an output signal OUT in response to the clock signal CK.

The transition detector 512 may generate a transition detection signal ED_T by detecting a case where the output signal OUT transitions from a low level to a high level or from a high level to a low level. For example, the transition detector 512 may include a delay D1 and an XOR gate XR1. The delay D1 may delay the output signal OUT for a predetermined time, and the XOR gate XR1 may generate the transition detection signal ED_T of a logic high level only when the output signal OUT and an output of the delay D1 have different values.

The NOR gate NR1 may perform a logic NOR operation on the transition detection signal ED_T and a global reset signal RST. The NOR gate NR1 may generate the initialization signal ECS_RSTB that is activated to a logic low level when one of the transition detection signal ED_T and the global reset signal RST is activated to a logic high level. Depending on an embodiment, the NOR gate NR1 may be included as a configuration of the transition detector 512. Depending on an embodiment, a buffer may be disposed at a rear end of the NOR gate NR1.

Figure 8:
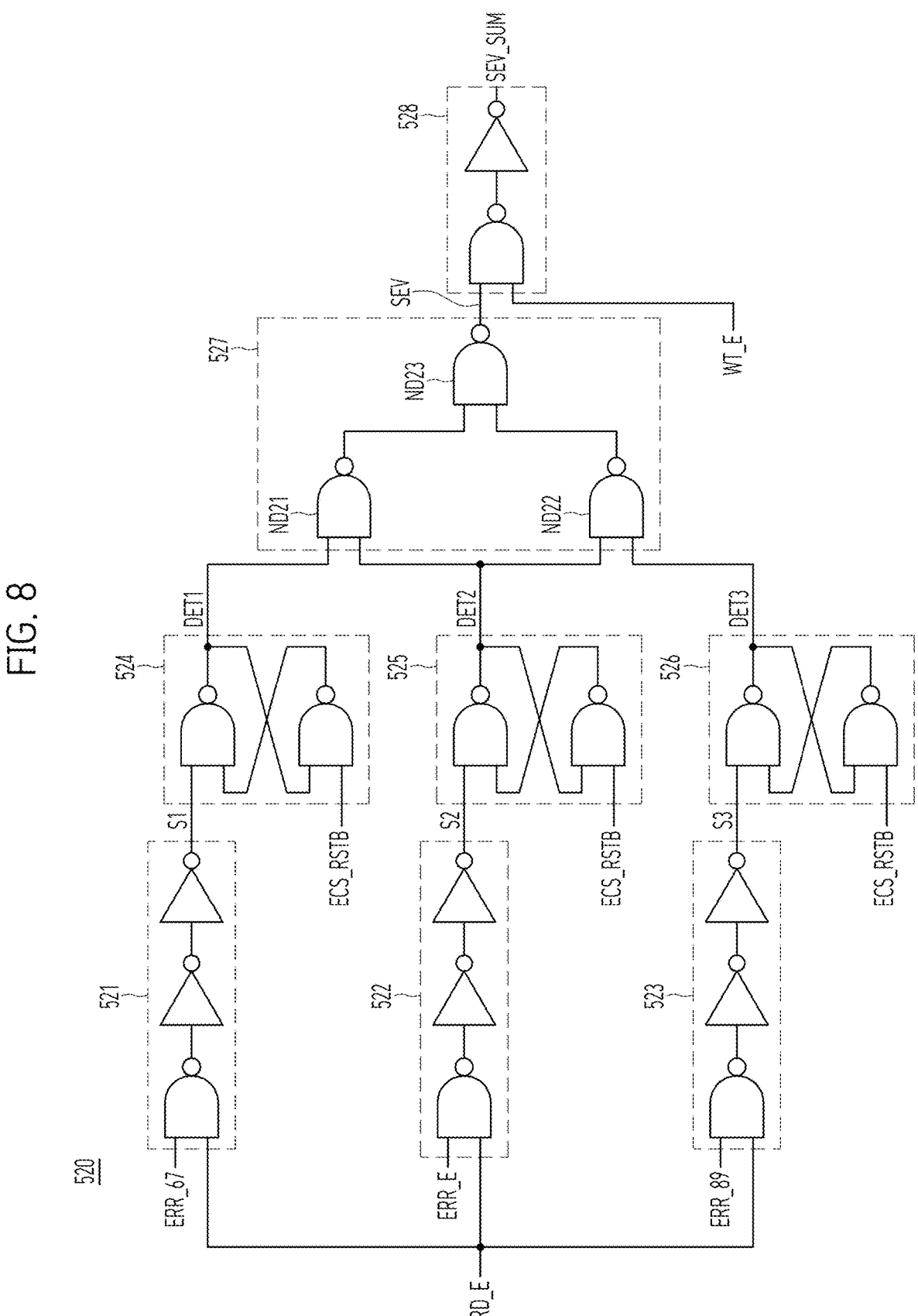
FIG. 8 is a detailed circuit diagram illustrating a detection circuit of FIG. 6, according to an embodiment of the present disclosure.

FIG. 8 is a detailed circuit diagram illustrating the detection circuit 520 of FIG. 6, according to an embodiment of the present disclosure.

Referring to FIG. 8, the detection circuit 520 may include first to third set signal generation circuits 521 to 523, first to third detection signal generation circuits 524 to 526, a severity determination circuit 527, and an output control circuit 528.

The first set signal generation circuit 521 may generate a first set signal S1 by inverting the fourth local error signal ERR_67 according to the scrub read signal RD_E. The second set signal generation circuit 522 may generate a second set signal S2 by inverting the fifth local error signal ERR_E according to the scrub read signal RD_E. The third set signal generation circuit 523 may generate a third set signal S3 by inverting the sixth local error signal ERR_89 according to the scrub read signal RD_E. For example, each of the first to third set signal generation circuits 521 to 523 may include a NAND gate and an even number of inverters.

The first detection signal generation circuit 524 may generate a first detection signal DET1 which is set according to the first set signal S1 and reset according to the initialization signal ECS_RSTB. The first detection signal generation circuit 524 may be implemented with a known SR latch. For example, the first detection signal generation circuit 524 may generate the first detection signal DET1 which becomes a logic high level according to the first set signal S1 of a logic low level and becomes a logic low level according to the initialization signal ECS_RSTB of a logic low level. The second detection signal generation circuit 525 may generate a second detection signal DET2 which is set according to the second set signal S2 and reset according to the initialization signal ECS_RSTB. The third detection signal generation circuit 526 may generate a third detection signal DET3 which is set according to the third set signal S3 and reset according to the initialization signal ECS_RSTB. The second and third detection signal generation circuits 525 and 526 may have substantially the same configuration as the first detection signal generation circuit 524.

The severity determination circuit 527 may detect a detection result SEV by determining the severe error based on the first to third detection signals DET1 to DET. When the second detection signal DET2 is activated and at least one of the first detection signal DET1 and the third detection signal DET3 is activated, the severity determination circuit 527 may output the detection result SEV activated to a logic high level. For example, the severity determination circuit 527 may include first to third NAND gates ND21 to ND23. The first NAND gate ND21 may perform a logic NAND operation on the first detection signal DET1 and the second detection signal DET2. The second NAND gate ND22 may perform a logic NAND operation on the second detection signal DET2 and a third detection signal DET3. The third NAND gate ND23 may perform a logic NAND operation on outputs of the first NAND gate ND21 and the second NAND gate ND22, to output the detection result SEV.

The output control circuit 528 may output the detection result SEV as the detection signal SEV_SUM according to the scrub write signal WT_E. For example, the output control circuit 528 may include a NAND gate and an inverter, which performs a logic AND operation on the scrub write signal WT_E and the detection result SEV to output the detection signal SEV_SUM.

Hereinafter, referring to FIG. 9, an operation of the severe error detection circuit 410 described in FIGS. 6 to 8 will be described.

Figure 9:
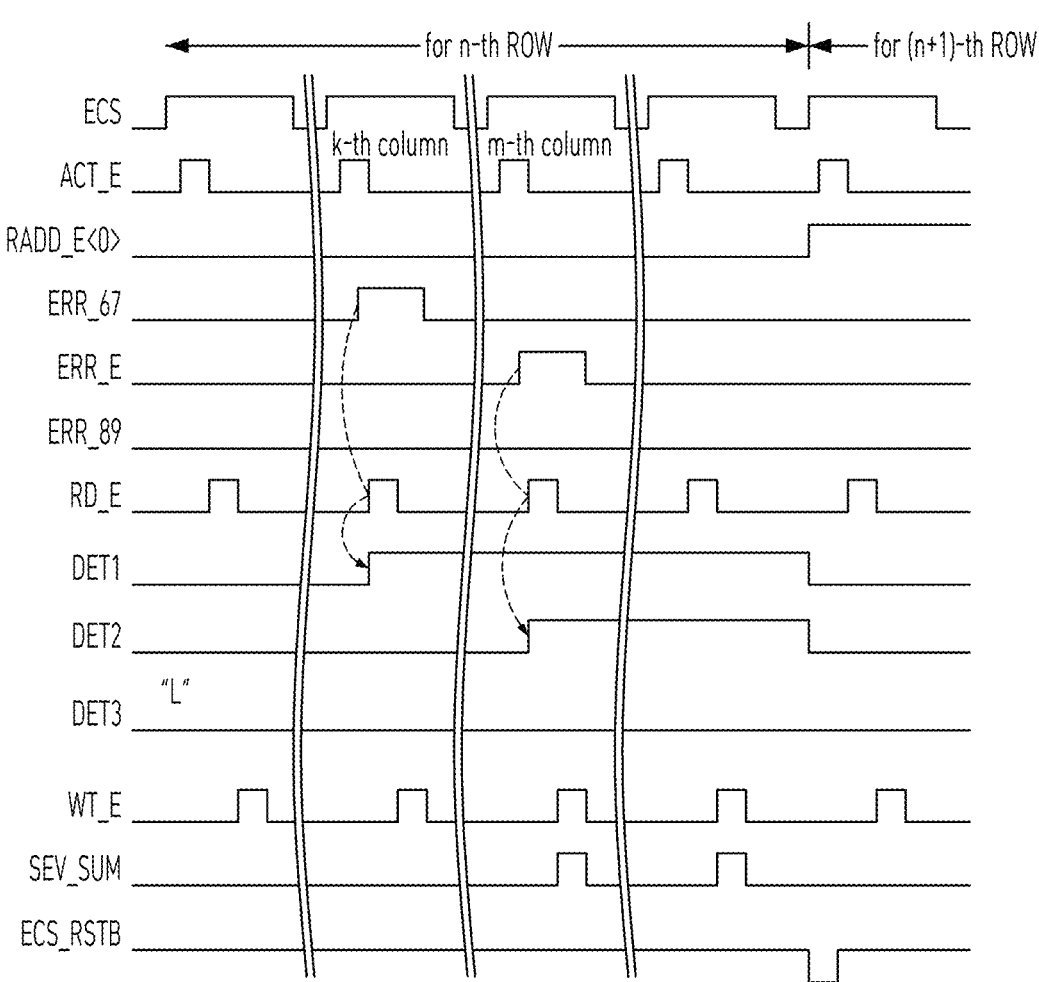
FIG. 9 is a timing diagram for describing an operation of the severe error detection circuit of FIG. 6, according to an embodiment of the present disclosure.

FIG. 9 is a timing diagram for describing an operation of the severe error detection circuit 410 of FIG. 6, according to an embodiment of the present disclosure.

The scrub control circuit 180 may sequentially activate the scrub active signal ACT_E, the scrub read signal RD_E, and the scrub write signal WT_E according to the scrub command ECS. Whenever the scrub command ECS is input, the scrub control circuit 180 increases a value of the scrub column address CADD_E by "+1", and may increase a value of the scrub row address RADD_E by "+1" when a value of the scrub column address CADD_E reaches a maximum value. Whenever the value of the scrub row address RADD_E increases by "+1", the LSB (RADD_E<0>) of the scrub row address RADD_E may toggle.

During an error check operation on an n-th row, the error correction circuit 172 may output information on a cell block in which an error has occurred among the cell blocks MB0 to MB15 and MBECC as the local error signals ERR_#. For example, during the error check operation on the n-th row and a k-th column, the fourth local error signal ERR_67 may be activated when an error occurs in the seventh normal cell block MB6 or the eighth normal cell block MB7. Further, during the error check operation on the n-th row and the m-th column, the fifth local error signal ERR_E may be activated when an error occurs in the ECC cell block MBECC.

The detection circuit 520 may set the first detection signal DET1 to a logic high level according to the scrub read signal RD_E and the fourth local error signal ERR_67, and set the second detection signal DET2 to a logic high level according to the scrub read signal RD_E and the fifth local error signal ERR_E. When both the first detection signal DET1 and the second detection signal DET2 have a logic high level, the detection circuit 520 may determine that a severe error has occurred, to thereby generate the detection result SEV of a logic high level, and output the detection result SEV as the detection signal SEV_SUM according to the scrub write signal WT_E.

Thereafter, as the value of the scrub column address CADD_E reaches a maximum value and the LSB (RADD_E<0>) of the scrub row address RADD_E toggles, the initial control circuit 510 may activate the initialization signal ECS_RSTB to a logic low level. Accordingly, the detection circuit 520 may initialize the first to third detection signals DET1 to DET3 to a logic low level.

As described above, in an embodiment of the present disclosure, the severe error detection circuit 410 may output the detection signal SEV_SUM by detecting, during an error check operation on a row corresponding to the scrub row address RADD_E, whether the severe error has occurred in the corresponding row based on the fourth to sixth local error signals ERR_67, ERR_E, and ERR_89.

FIG. 10 is a flowchart for describing an error check operation according to an embodiment of the present disclosure.

Referring to FIG. 10, the scrub row address RADD_E and a scrub column address CADD_E may be initialized during power-up (at operation S110).

When the scrub command ECS is input to instruct an error check operation, the error check operation may be performed (at operation S120). Detailed operations of the error check operation will be described with reference to FIG. 11.

As described in FIG. 9, during an error check operation on a row (hereinafter referred to as a target row) corresponding to the scrub row address RADD_E, the severe error detection circuit 410 may detect whether a severe error has occurred in the target row based on the fourth to sixth local error signals ERR_67, ERR_E, and ERR_89 (at operation S130).

When the severe error is detected ("YES" at the operation S130), the severe error detection circuit 410 may output the detection signal SEV_SUM of a logic high level, and the error storage circuit 420 may store the scrub row address RADD_E as the severe address RA_SEV according to the detection signal SEV_SUM (at operation S140). On the other hand, when the severe error is not detected ("NO" at the operation S130), the error storage circuit 420 does not store the severe address RA_SEV.

Until the value of the scrub column address CADD_E reaches a maximum value ("NO" at operation S150), the scrub control circuit 180 may increase the value of the scrub column address CADD_E by "+1" (at operation S160), and the above operations S120 to S140 may be repeatedly performed.

Thereafter, when the value of the scrub column address CADD_E reaches the maximum value ("YES" at operation S150), the error log circuit 176 may store error information E_INFO on the target row corresponding to the scrub row address RADD_E according to the error signal ERR (at operation S170). Until the value of the scrub row address CADD_E reaches a maximum value ("NO" at operation S180), the scrub control circuit 180 may increase the value of the scrub row address RADD_E by "+1", and accordingly, the severe error detection circuit 410 may activate the initialization signal ECS_RSTB to initialize the detection signal SEV_SUM (at operation S190). The above operations S120 to S190 may be repeatedly performed until the scrub row address RADD_E reaches the maximum value.

When the value of the scrub row address RADD_E reaches the maximum value ("YES" at operation S180), the error check operation for all rows may be terminated.

After the error check operation for all rows has completed, the error log circuit 176 may transmit the stored error information E_INFO to the memory controller through the data output circuit 134 according to the error information request command ERR_OUT. According to an embodiment, the write-back prevention circuit 190 may provide the stored severe address RA_SEV to the error log circuit 176, and the severe address RA_SEV may be transmitted as a part of the error information E_INFO to the memory controller.

Figure 11:
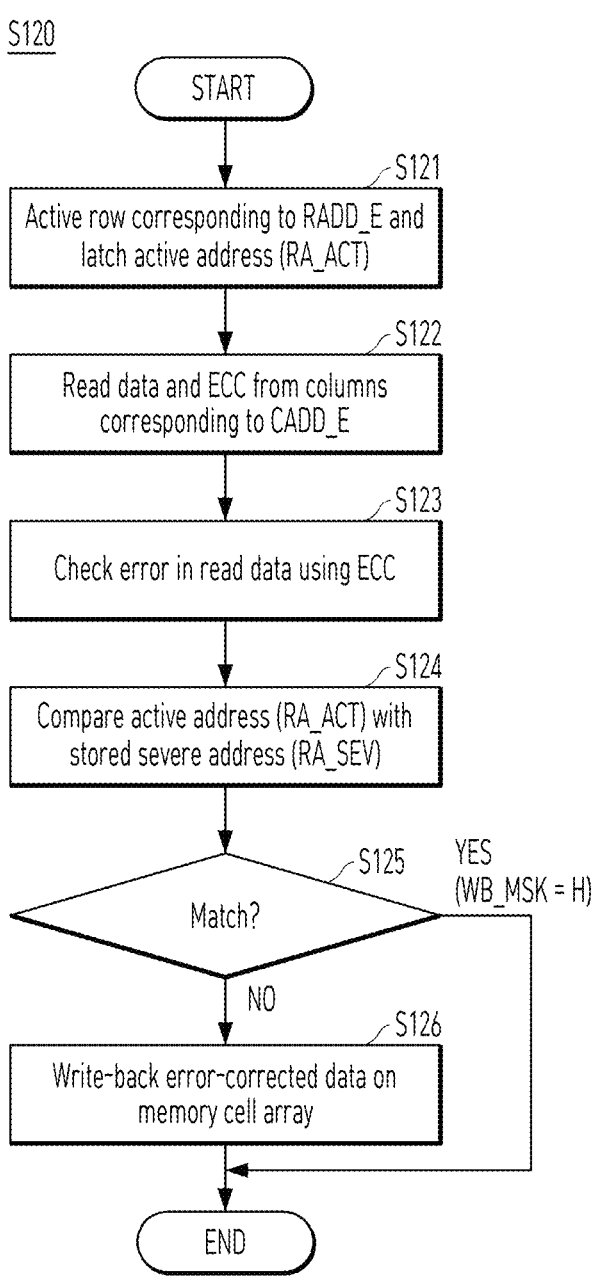

FIG. 11 is a flowchart for describing the error check operation of S120 shown in FIG. 10, according to an embodiment of the present disclosure.

Referring to FIG. 11, the scrub control circuit 180 may generate the scrub row address RADD_E and the scrub column address CADD_E according to the scrub command ECS, and sequentially activate the scrub active signal ACT_E, the scrub read signal RD_E, the scrub write signal WT_E, and the scrub precharge signal PCG_E.

The row control circuit 112 may perform an active operation of activating a row selected by the scrub row address RADD_E according to the scrub active signal ACT_E (at operation S121). In this case, the active latch 430 may latch the scrub row address RADD_E as the active address RA_ACT according to the scrub active signal ACT_E (at operation S121).

The column control circuit 114 may perform a read operation of reading the data DATA' and the error correction code ECC from the memory cells MC through columns selected by the scrub column address CADD_E according to the scrub read signal RD_E (at operation S122).

The error correction circuit 172 may check and correct an error in the read data DATA' by using the read error correction code ECC (at operation S123). The error correction circuit 172 may output information on a cell block in which an error has occurred among the cell blocks MB0 to MB15 and MBECC as the local error signals ERR_#, and may activate the error signal ERR when any of the local error signals ERR_# is activated. The error log circuit 176 may store the error information E_INFO according to the error signal ERR. In this case, the read operation at operation S122 and the check operation at operation S123 in FIG. 11 may be performed at substantially the same time as the operation at the operation S130 in FIG. 10.

The write-back control circuit 440 may be enabled according to the scrub command ECS, to generate the masking signal WB_MSK by comparing the severe address RA_SEV previously stored in the error storage circuit 420 with the active address RA_ACT latched in the active latch 430 (at operation S124). The write-back control circuit 440 may determine, according to a comparison result, whether the severe address RA_SEV matches the active address RA_ACT or not (at operation S125).

The write-back control circuit 440 may activate the masking signal WB_MSK to a logic high level when the severe address RA_SEV matches the active address RA_ACT ("YES" at the operation S125).

Thereafter, the ECC generation circuit 174 may generate the error correction code ECC by using the error-corrected data. The column control circuit 114 may perform a write-back operation of writing the data DATA' and the error correction code ECC to the memory cells MC through the columns selected according to the scrub write signal WT_E, while omitting the write-back operation when the masking signal WB_MSK is activated. That is, the column control circuit 114 may perform the write-back operation (at operation S126) only when the severe address RA_SEV does not match the active address RA_ACT ("NO" at the operation S125). The write-back operation at the operation S126 of FIG. 11 may be performed at substantially the same time as the operation at the operation S140 of FIG. 10.

Figure 12:
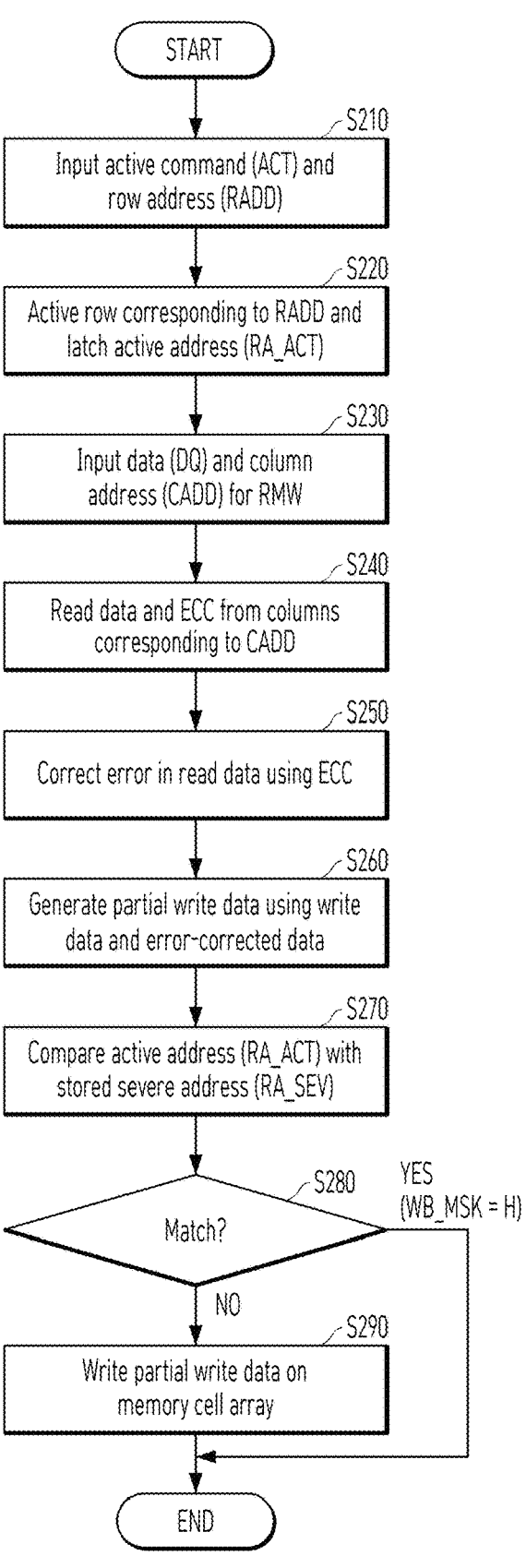
FIG. 12 is a flowchart for describing a read-modify-write (RMW) operation according to an embodiment of the present disclosure.

FIG. 12 is a flowchart for describing a read-modify-write (RMW) operation according to an embodiment of the present disclosure.

Referring to FIG. 12, the row address RADD is inputted from a memory controller together with the active command ACT (at operation S210). The row control circuit 112 may perform an active operation of activating a row selected by the row address RADD according to the active command ACT (at operation S220). In this case, the active latch 430 may latch the row address RADD as the active address RA_ACT according to the active command ACT.

Thereafter, the column address CADD and the data DQ to be written are input from the memory controller along with a command instructing the RMW operation (at operation S230). The command decoder 140 may sequentially generate a read command RD, a modification signal MODI, and a write command WT.

The column control circuit 114 may perform a read operation of reading the data DATA' and the error correction code ECC from the memory cells MC through columns selected by the column address CADD according to the read command RD (at operation S240). The error correction circuit 172 may output the error-corrected data DATA by correcting an error of the read data DATA' by using the read error correction code ECC (at operation S250).

The modification circuit 178 may generate partial write data by combining the data DQ transmitted from the memory controller and the error-corrected data DATA in response to the modification signal MODI (at operation S260). Thereafter, the ECC generation circuit 174 may generate the error correction code ECC by using the partial write data.

The write-back control circuit 440 may be enabled according to the modification signal MODI, to generate the masking signal WB_MSK by comparing the severe address RA_SEV previously stored in the error storage circuit 420 with the active address RA_ACT latched in the active latch 430 (at operation S270). The write-back control circuit 440 may determine, according to a comparison result, whether the severe address RA_SEV matches the active address RA_ACT or not (at operation S280).

The write-back control circuit 440 may activate the masking signal WB_MSK to a logic high level when the severe address RA_SEV matches the active address RA_ACT ("YES" at the operation S280).

The column control circuit 114 may perform a write-back operation of writing the data DATA' and the error correction code ECC to the memory cells MC through the columns selected according to the write command WT, while omitting the write-back operation when the masking signal WB_MSK is activated. That is, the column control circuit 114 may perform the write-back operation (at operation S290) only when the serial address RA_SEV does not match the active address RA_ACT ("NO" at the operation S280).

Figure 13:
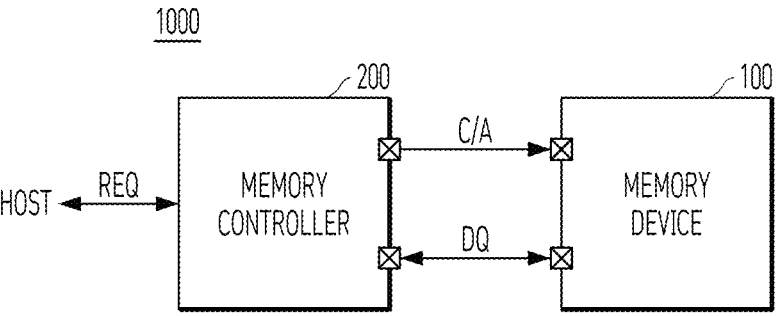
FIG. 13 is a block diagram illustrating a memory system according to an embodiment of the present disclosure.

FIG. 13 is a block diagram illustrating a memory system 1000 according to an embodiment of the present disclosure.

Referring to FIG. 13, the memory system 1000 may include a memory device 100 and a memory controller 200.

The memory controller 200 may control an overall operation of the memory system 1000 and control a data exchange between a host and the memory device 100. The memory controller 200 may generate a command/address signal C/A in response to a request REQ from the host and provide the command/address signal C/A to the memory device 100. According to an embodiment, the memory controller 200 may provide a clock together with the command/address signal C/A to the memory device 100. The memory controller 200 may provide data DQ corresponding to the request REQ provided from the host to the memory device 100. The memory controller 200 may provide the data DQ read from the memory device 100 to the host. The memory controller 200 may provide the command/address signal C/A indicating an active operation, a precharge operation, a read operation, a write operation, an error check operation, a read-modify-write (RMW) operation, and the like to the memory device 100.

The memory device 100 may have substantially the same configuration as the memory device 100 of FIG. 1. During an error check operation for each row, the memory device 100 may detect a severe error in which an error occurs in both an ECC cell block MBECC and one or more normal cell blocks among the normal cell blocks MB6 to MB9 which share sub-word line drivers with the ECC cell block MBECC, and store a row address of the row having the detected severe error as a severe address RA_SEV. When the row address input during the error check operation or the RMW operation is identical to the stored depth address RA_SEV, the memory device 100 may omit a write-back operation for the corresponding row. Accordingly, the memory device 100 and the memory system 1000 including the same may prevent the miscorrection caused by the severe error and maximize the error correction capability.

Various embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made based on the technological scope of the present disclosure in addition to the embodiments disclosed herein. The embodiments may be combined to form additional embodiments.

It should be noted that although the technical spirit of the disclosure has been described in connection with embodiments thereof, this is merely for description purposes and should not be interpreted as limiting. It should be appreciated by one of ordinary skill in the art that various changes may be made thereto without departing from the technical spirit of the present disclosure and the following claims.

For example, for the logic gates and transistors provided as examples in the above-described embodiments, different positions and types may be implemented depending on the polarity of the input signal.

What is claimed is:

1. A memory device comprising:
   a memory cell array including normal cell blocks and at least one error correction code (ECC) cell block, which include a plurality of rows;
   a scrub control circuit configured to perform an error check operation on each of the plurality of rows; and
   a write-back prevention circuit configured to store, based on local error signals for the normal cell blocks and the at least one ECC cell block during the error check operation, a severe address for a row in which a severe error occurs, and selectively perform a write-back operation on the row corresponding to the stored severe address during the error check operation or a read-modify-write (RMW) operation.

2. The memory device of claim 1, wherein the write-back prevention circuit is configured to detect the severe error when an error occurs in both the at least one ECC cell block and one or more normal cell blocks adjacent to the ECC cell block, among the normal cell blocks.

3. The memory device of claim 2, wherein the one or more normal cell blocks adjacent to the at least one ECC cell block share sub-word line drivers with the at least one ECC cell block.

4. The memory device of claim 1, wherein the write-back prevention circuit includes:
   a severe error detection circuit configured to output a detection signal by detecting, based on the local error signals, whether the severe error has occurred in a row corresponding to a scrub row address, during the error check operation;
   an error storage circuit configured to store the scrub row address as the severe address according to the detection signal; and
   a write-back control circuit configured to compare the stored severe address and an input address to generate a masking signal, during the error check operation or the RMW operation.

5. The memory device of claim 4, further comprising:
   a column control circuit configured to perform the write-back operation of writing data to the normal cell blocks and the at least one ECC cell block, during the error check operation or the RMW operation,
   wherein the write-back operation is skipped according to the masking signal.

6. The memory device of claim 4, wherein the severe error detection circuit includes:
   an initial control circuit configured to activate an initialization signal when the scrub row address is changed, during the error check operation; and
   a detection circuit configured to be initialized according to the initialization signal, and detect, based on the local error signals, whether the server error has occurred in the row corresponding to the scrub row address to output the detection signal.

7. The memory device of claim 6, wherein the initial control circuit includes:
   a flip-flop configured to receive a least signature bit (LSB) of the scrub row address to output an output signal, for each error check operation; and
   a transition detector configured to output the initialization signal by detecting a transition of the output signal.

8. The memory device of claim 6, wherein the detection circuit includes:
   a first detection signal generation circuit configured to generate a first detection signal that is set according to a local error signal for a first normal cell block adjacent to the at least one ECC cell block, among the normal cell blocks and reset according to the initialization signal;

a second detection signal generation circuit configured to generate a second detection signal that is set according to a local error signal for the at least one ECC cell block and reset according to the initialization signal;

a third detection signal generation circuit configured to generate a third detection signal that is set according to a local error signal for a second normal cell blocks adjacent to the at least one ECC cell block, among the normal cell blocks and reset according to the initialization signal; and a severity determination circuit configured to output the detection signal based on the first to third detection signals.

9. The memory device of claim 8, wherein the severe determination circuit is configured to activate the detection signal when the second detection signal is activated and at least one of the first detection signal and the third detection signal is activated.

10. The memory device of claim 1, wherein the normal cell blocks include first to 2m-th normal cell blocks, and wherein the first to m-th normal cell blocks, the at least one ECC cell block, and the (m+1)-th to 2m-th normal cell blocks are sequentially arranged in a first direction, where m is a natural number greater than 2.

11. The memory device of claim 1, further comprising:

an error correction circuit configured to generate, during the error check operation, the local error signals corresponding to the at least one ECC cell block and one of normal cell blocks adjacent to the at least one ECC cell block, among the normal cell blocks.

12. The memory device of claim 1, further comprising:

an error log circuit configured to store error information based on the local error signals and output the error information to an external device according to an error information request command, the error information including the stored severe address.

13. A memory device comprising:

a plurality of normal cell blocks and at least one error correction code (ECC) cell block;

a first detection signal generation circuit configured to generate, during an error check operation, a first detection signal according to a local error signal for a first normal cell block adjacent to the at least one ECC cell block, among the plurality of normal cell blocks;

a second detection signal generation circuit configured to generate a second detection signal according to a local error signal for the at least one ECC cell block, during the error check operation;

a third detection signal generation circuit configured to generate, during the error check operation, a third detection signal according to a local error signal for a second normal cell block adjacent to the at least one ECC cell block, among the plurality of normal cell blocks;

a severity determination circuit configured to generate a detection signal based on the first to third detection signals;

an error storage circuit configured to store a row address according to the detection signal; and a write-back control circuit configured to control a write-back operation of a row corresponding to the stored row address, to be skipped.

14. The memory device of claim 13, wherein the first and second normal cell blocks share sub-word line drivers with the at least one ECC cell block.

15. The memory device of claim 13, wherein the severity determination circuit is configured to activate the detection signal when the second detection signal is activated and at least one of the first detection signal and the third detection signal is activated.

16. The memory device of claim 13, wherein the first to third detection signal generation circuits are configured to initialize the first to third detection signals in response to an initialization signal activated when the row address is changed.

17. The memory device of claim 13, wherein the write-back operation includes a write operation performed during the error check operation or a write operation performed during a read-modify-write (RMW) operation.

18. An operating method of a memory device including a plurality of normal cell blocks and at least one error correction code (ECC) cell block, which include a plurality of rows, the operating method comprising:

performing an error check operation on a target row among the plurality of rows;

generating a detection signal based on local error signals for the normal cell blocks and the at least one ECC cell block, during the error check operation;

storing a severe address for the target row in an error storage circuit according to the detection signal;

initializing the detection signal when completing the error check operation, wherein the performing the error check operation, the generating the detection signal, the storing the severe address, and the initializing the detection signal are repeatedly performed on the plurality of rows;

comparing the severe address stored in the error storage circuit with an input address to generate a masking signal; and performing a write-back operation during the error check operation or a read-modify-write (RMW) operation, wherein the write-back operation is skipped according to the masking signal.

19. The operating method of claim 18, further comprising:

generating, during the error check operation, the local error signals corresponding to the at least one ECC cell block and one of normal cell blocks adjacent to the at least one ECC cell block, among the plurality of normal cell blocks.

20. The operating method of claim 19, wherein one of the normal cell blocks adjacent to the at least one ECC cell block shares sub-word line drivers with the at least one ECC cell block.

21. The operating method of claim 18, further comprising:

storing error information based on the local error signals; and outputting the error information to an external device according to an error information request command, the error information including the severe address.

* * * * *